J. V. IRENIUS.
BOTTLE FEEDING DEVICE FOR BOTTLE CAPPING MACHINES.
APPLICATION FILED APR. 27, 1911.

1,101,744.

Patented June 30, 1914.
6 SHEETS—SHEET 1.

Fig. 1.

J. V. IRENIUS.
BOTTLE FEEDING DEVICE FOR BOTTLE CAPPING MACHINES.
APPLICATION FILED APR. 27, 1911.

1,101,744.

Patented June 30, 1914.
6 SHEETS—SHEET 3.

J. V. IRENIUS.
BOTTLE FEEDING DEVICE FOR BOTTLE CAPPING MACHINES.
APPLICATION FILED APR. 27, 1911.

1,101,744.

Patented June 30, 1914.
6 SHEETS—SHEET 4.

Witnesses:

Inventor
Joseph V. Irenius
By his Attorneys

J. V. IRENIUS.
BOTTLE FEEDING DEVICE FOR BOTTLE CAPPING MACHINES.
APPLICATION FILED APR. 27, 1911.

1,101,744.

Patented June 30, 1914.
6 SHEETS—SHEET 5.

UNITED STATES PATENT OFFICE.

JOSEPH V. IRENIUS, OF NEWARK, NEW JERSEY, ASSIGNOR TO IMPERIAL STOPPER COMPANY, A CORPORATION OF MAINE.

BOTTLE-FEEDING DEVICE FOR BOTTLE-CAPPING MACHINES.

1,101,744.   Specification of Letters Patent.   Patented June 30, 1914.

Application filed April 27, 1911. Serial No. 623,794.

*To all whom it may concern:*

Be it known that I, JOSEPH V. IRENIUS, a citizen of the United States, residing at Newark, in the county of Essex and State of New Jersey, have invented certain new and useful Improvements in Bottle-Feeding Devices for Bottle-Capping Machines, of which the following is a full, clear, and exact description.

This invention relates to shifting and feeding mechanisms, and more particularly to an apparatus for feeding bottles, or the like, to a bottle sealing machine, and has for its object the provision of novel means for continuously delivering, for example, bottles to points in a suitable mechanism where said bottles may be capped, and thereafter delivering the bottles or receptacles so capped or sealed to convenient points at which they may be collected.

To attain the ends above mentioned, my herein described invention involves novel elements and combinations of elements, all of which will be hereinafter referred to, and more particularly set forth in the appended claims.

Referring to the drawings which form a part hereof, and in which like reference characters designate like parts throughout the several views.

Figure 1:
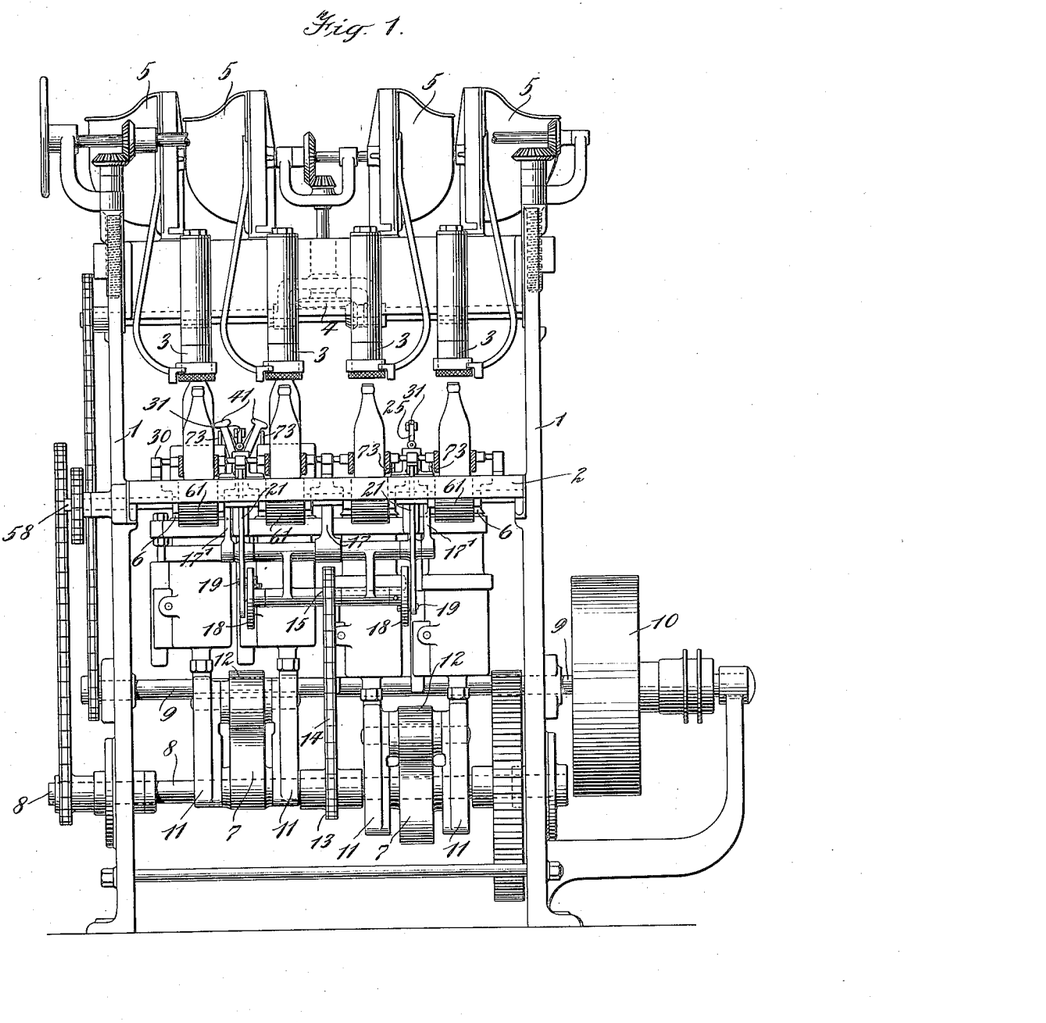
Figure 1 is a front elevation of one form of bottling apparatus with my novel feeding mechanism applied thereto.
Figure 5:
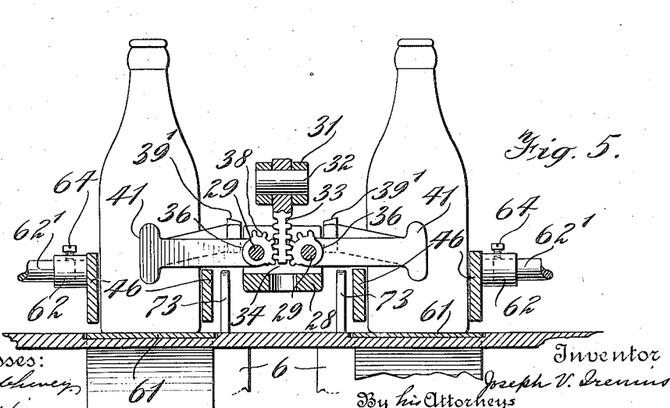
Fig. 5 is a detail or fragmentary section taken on line V—V of Fig. 6.
Figures 6, 7:
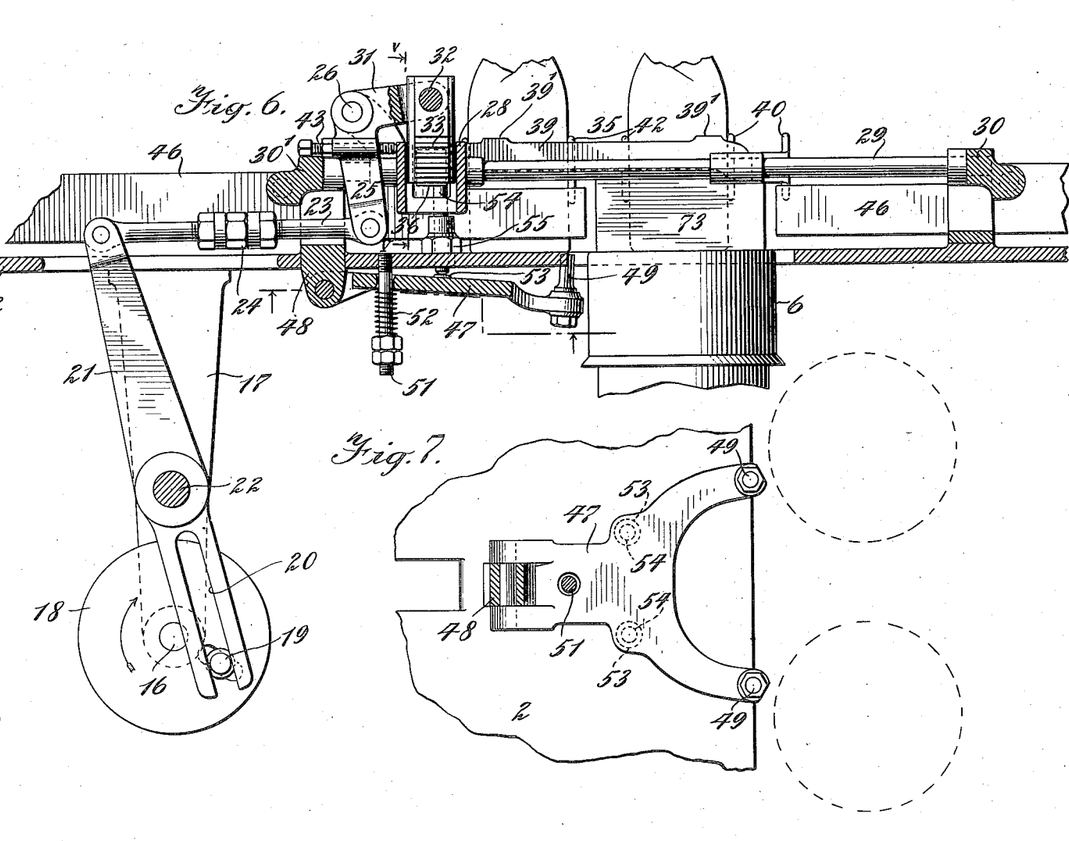
Fig. 6 is a vertical fragmentary section taken on the line VI—VI of Fig. 3.
Fig. 7 is a detail bottom view of a bifurcated lever referred to hereinafter.

The capping mechanism proper will not be described at length herein, since the present application is particularly concerned with the bottle-feed mechanism proper and the combination of the same broadly with a capping machine. The construction employed in the capping machine may be varied within wide limits, but the feeding mechanism is particularly well adapted to multiple head machines of the type in question or of an analogous description. In brief therefore, the machine illustrated in Fig. 1 comprises side frames or standards 1 suitably connected together to form a frame. This frame carries a table 2, which preferably constitutes the support for the feeding mechanism hereinafter referred to. The capping heads 3 are mounted upon a crosshead 4, which latter further supports the hoppers 5 from which the stoppers or caps are delivered to the mouths of the respective heads, preparatory to capping the bottles delivered thereunder. These heads are preferably arranged in alinement as shown and correspondingly alined therebeneath are the reciprocable supports or plungers 6, which in this form of the capping machine drive the bottles up into the heads for capping the bottles. The construction of these reciprocable parts will not be further referred to, except to state that they may be provided with some form of compensating mechanism to accommodate bottles of different lengths. These plungers are reciprocated by means of cams 7, two of which are provided, angularly spaced apart 180° and mounted upon a cam-shaft 8. This shaft is driven by means of suitable gearing from a countershaft 9, which carries the usual driving pulley 10. The cams 7 are disposed between forks 11 and bear against rollers 12 which are mounted between pairs of these forks; one fork being provided for each of the plunger mechanisms above referred to, so that the left hand cam 7 serves to raise and lower the two left hand bottle supports, while the corresponding right hand cam 7 operates the two supports shown upon the right hand side of Fig. 1. It is obvious, since these cams are angularly spaced apart 180°, that the left hand pair of bottles which are upon the said supports will be in their uppermost position as shown in Fig. 1, when a pair of bottles upon the right hand side are being fed to or emplaced upon the right hand pair of supports, and vice versa. Centrally disposed upon the shaft 8 is a sprocket 13 which is in engagement with a chain 14 which drives a sprocket 15 mounted upon a shaft 16 journaled in suitable brackets 17′ which depend from the underside of the table 2, as best shown in Fig. 6. Mounted upon either extremity of the shaft 16 is a crank disk 18, the wrist pin or stud 19 of each of which disks extends out laterally therefrom, the said pins being substantially diametrically opposite with respect to their common axis of rotation. Each pin rides in a slot 20 provided in the lower arm of a lever 21 which is mounted upon a shaft 22 disposed parallel to and above shaft 16, and carried by the brackets 17, 17'. Two levers 21 are provided, one adjacent either extremity of shaft 22, and their respective upper extremities are each pivotally connected to a link 23. Each of these links is preferably provided with nuts 24 for adjusting its length. The forward extremity of each link 23 is connected to a lower arm 25 of a bell-crank, which is pivoted at 26 between a pair of upstanding ears 27 which are integrally united to a carriage 28. Two of these carriages are provided, one for the right hand side of the machine, and one for the left, and they are mounted upon pairs of guide rods 29 which are permanently mounted in position above the table 2 and parallel thereto; the extremities of these rods being received into supporting brackets 30, 30' for the same, which are secured in any suitable manner to the upper surface of the table 2. The upper or substantially horizontal arm 31 of each bell-lever is pivotally connected by means of a pin 32 to a short rack section 33. The carriage 28 is preferably apertured immediately below this rack so as to afford room for the downward movement of the latter, and is slotted cross-wise as indicated at 34 in Figs. 4 and 5, for the reception of the forward extremities of pronged shifting members broadly designated 35. The forward and rear extremities of these members are hubbed as at 36—37, the forward hubs 36 each being provided with a series of teeth 38 which are disposed in engagement with the respective sides of the rack 33. The shifting members 35 are of somewhat peculiar configuration and are designed to ride freely upon the guide rods 29, one member 35 being mounted upon each guide rod and being not alone longitudinally displaceable thereover, but being further revolubly mounted upon said rod. Each member 35 preferably comprises a rod like portion 39 disposed between the hubs 36—37 above referred to through which extend the respective guide rods 29. These rod like parts are preferably provided with bosses 39' which serve as stops for the upward movement of the prongs, the opposed bosses abutting against each other when the prongs are in their uppermost positions.

Figure 4:
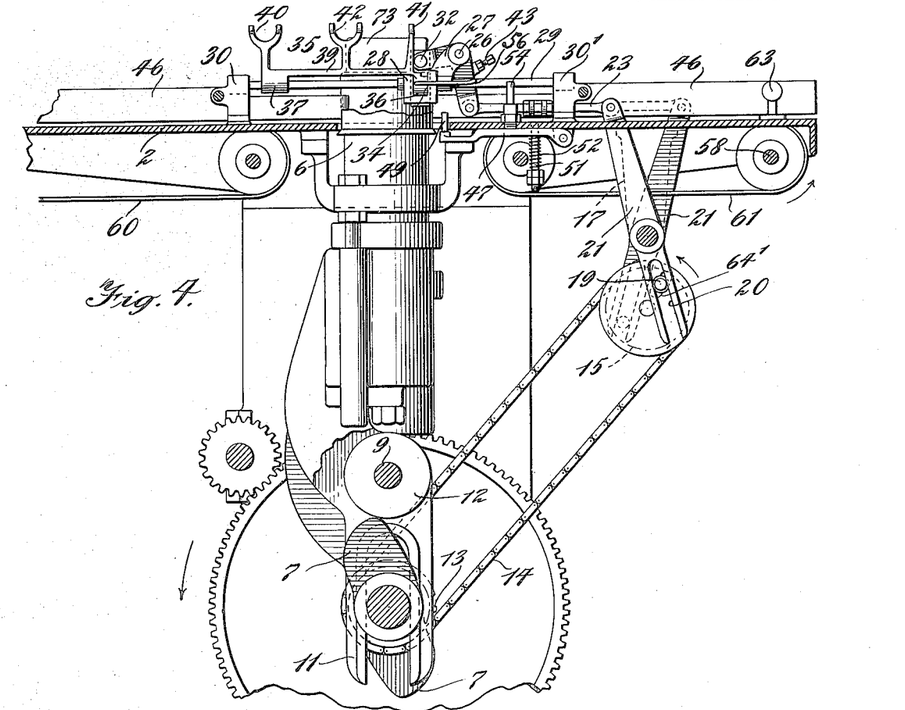
Fig. 4 is a detail section taken substantially on line IV—IV of Fig. 3.

Laterally projecting from hub 37, as best shown in Fig. 4, is a bifurcated prong 40, while a single prong 41 similarly extends from the forward extremity of the rod like portion 39; and a second bifurcated prong 42 is disposed in the same plane as those just mentioned, and substantially midway therebetween. By reason of the disposition of the segmental gear hubs 36 in their respective slots 34, the shifting members are constrained to reciprocate longitudinally of the guide rods 29 in pairs as the respective carriages 28 are advanced or retracted over the table, and it is obvious, by reason of the construction shown in Figs. 4, 5 and 6, that when a link 23 is first caused to advance toward the vertical plane of the capping heads, it drives the arm 25 of its bell-lever inwardly until an adjustable stop, which in this instance is a set screw 43 which extends through this arm, engages a portion of the carriage 28 and limits the further movement of the arm with respect to said carriage. The movement already accomplished, however, has served to elevate the corresponding rack 33 and has thereby caused a pair of the pronged shifting members 35 to be rotated outwardly with respect to the rack into the positions occupied by such parts in Fig. 5, the prongs being then substantially in parallelism with the table.

Figure 3:
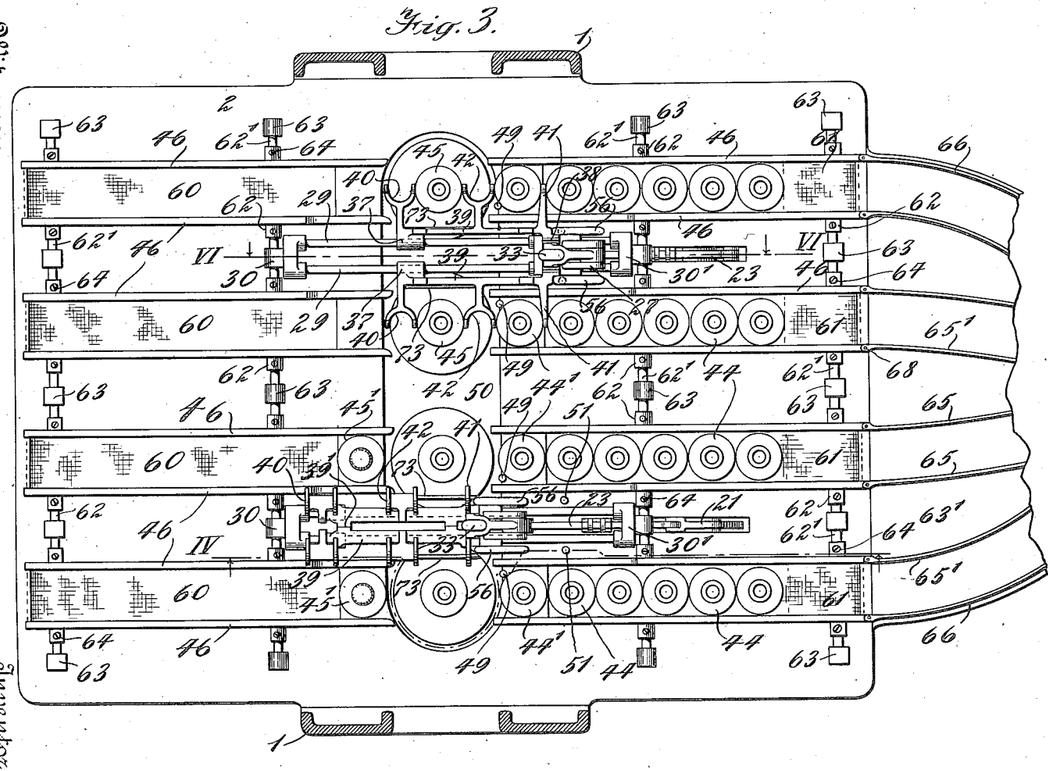
Fig. 3 is a horizontal section taken on the line III—III of Fig. 2, and viewed in the direction of the arrows.

Assuming now that a series of bottles are disposed in substantial juxtaposition to each other, as shown in Fig. 3, wherein the said bottles have been designated 44, 44', the single prong 41 will have been swung down between the innermost bottle 44' of the series and that adjoining, while the bifurcated prong 42 will be disposed in advance of this innermost bottle, the distance between the right hand wing or finger of the bifurcated prong 42 and the prong 41 being but little more than the diameter of the bottle. These parts are hence adapted to advance this bottle toward the position occupied by bottle 45, which is substantially centrally disposed upon the plunger, and by reason of the fact that the bottle is supported laterally by the guard rails 46 which are located upon either side thereof and forwardly and rearwardly by the prongs above referred to, the likelihood of the bottle upsetting while being so advanced is substantially eliminated. Upon the return stroke of the lever 21 which operates the link 23 in question, the first movement rearwardly of the said link will cause the lower arm 25 of the bell-crank to which it is attached to swing outwardly and thereby move the rack downwardly through the carriage which will immediately swing the prongs of the shifting members upwardly into the position indicated to the left in Fig. 1. The longitudinal travel of these shifting members is approximately equal to the distance from the center of the bottle 44' shown in Fig. 3 to the center of the bottle 45, this distance being substantially equal to the diameter of a bottle plus the distance from the outer face of one wing or finger of a bifurcated prong to the outer face of the other finger of said prong. When the next forward movement of the link takes place, these shifting members will again be rotated outwardly with respect to each other, in the manner above described, and each of the prongs 41 will engage a new bottle, which will have been advanced in the meantime by means hereinafter referred to, to the position 44', while each of the bottles previously moved, and which occupy the positions designated 45 in Fig. 3, will be received between the opposed wings or fingers of the bifurcated prongs 40—42, and hence will be slid from off its seat upon the plunger which has just been operated to cap said bottle, and will be positioned substantially as at 45'.

Pivotally secured to the underside of the table is a bifurcated lever 47, which in this instance has been secured to a lug 48 which extends downwardly through an aperture in the table and which forms a part of one of the supports 30', above referred to. Each arm of this lever carries a stud or pin 49 which when the lever is in parallelism with the table extends upwardly through an aperture 50 in said table, in which aperture are disposed the plungers above referred to. The wall of said aperture 50 is notched slightly, in the present instance at four points, to accommodate these pins, there being one such pin for each bottle-way and each pin serving, when in its uppermost position, as a stop to prevent the advance of the bottle in contact therewith. The lever 47 is apertured preferably centrally thereof for the reception of a bolt 51 which depends from the table 2 and a spring 52 is disposed around this bolt and normally urges its lever 47 into its uppermost position. Upon either side of each lever 47 is a small boss 53 which is adapted for engagement with a pin 54 which is somewhat loosely held in a socket 55 for the same, each of these sockets being secured to the table 2 in any suitable manner, so that the pins 54 are held in position therein by reason of the support afforded by the respective levers 47. When one of these pins is depressed spring 52 yields and the corresponding stop pins 49 are withdrawn below the level of the surface of the table and permit free passage of a bottle thereover.

Pins 54 are depressed at the proper moment and are held in their depressed position for a proper length of time by means of horizontally disposed fingers 56, which are secured to the pronged members 35 in any suitable manner. When therefore a pair of these members has been pulled forwardly toward the front of the machine and the respective members of the said pair are thereafter caused to swing apart and downwardly in the manner above described, these fingers 56, which are carried by said members, will engage the corresponding pins 54 and thereby withdraw the stop pins 49 from the paths of the two bottles to be moved, allowing said bottles to be freely advanced and positioned upon the corresponding pair of plungers in the manner previously described.

We will next consider the auxiliary mechanisms which serve to advance the bottles toward the shifting members 35 and away from the same.

Figure 2:
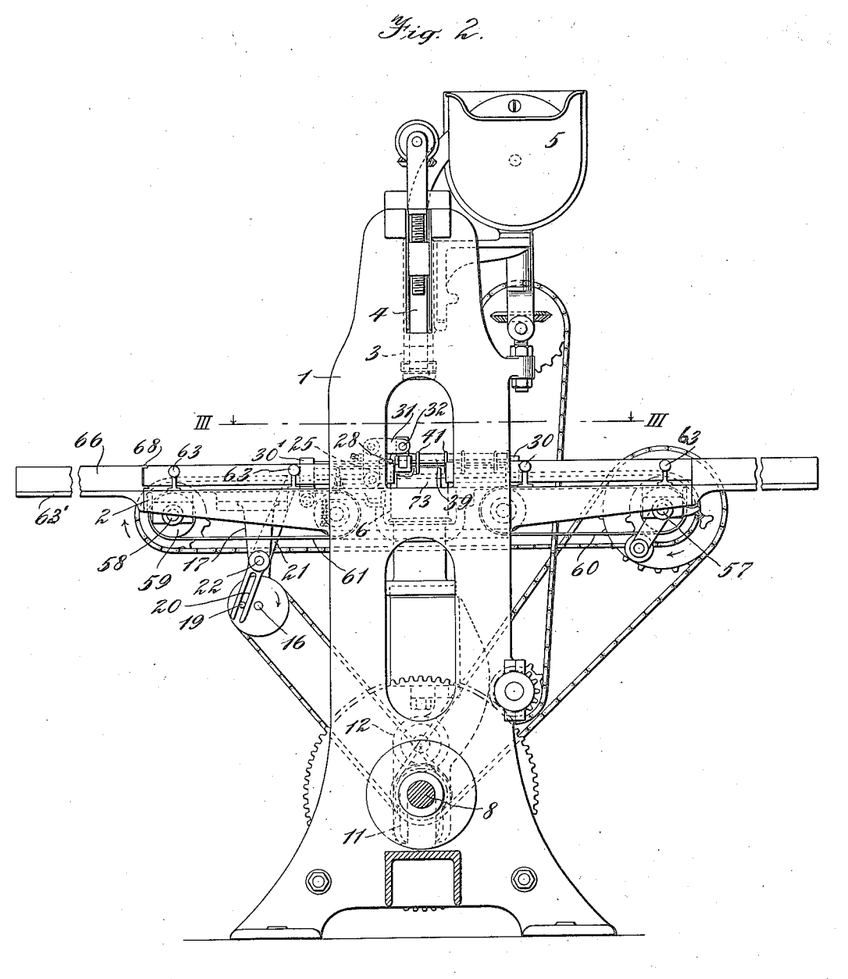
Fig. 2 is an end elevation of the same.

Referring to Figs. 1 and 2 it will be seen that the shaft 8 drives a countershaft 57 by means of a chain and sprocket connection, said shaft being supported in suitable bearings depending from the table 2. This countershaft in turn drives a second countershaft 58 in similar fashion, the latter shaft being located beneath the table at the front of the machine. Shafts 57 and 58 are designed to rotate at substantially the same speed and each of these drive short feeder belts 60 and 61, there being four belts 61, the uppermost surfaces of which form the bottoms of the channels or ways in which the bottles are advanced toward the capping heads, the sides of these channels being formed by the guide rails 46. Correspondingly belts 60 are four in number and their upper surfaces form the bottoms of the rear channels or delivery ways which serve to remove the bottles after being capped. The guide rails 46 are preferably formed with supporting lugs 62 adapted for the reception of pins 62' which are in turn rigidly held in brackets 30—30' and 63. These brackets, of which a number are provided as indicated in Fig. 3, are secured to the table in any suitable manner, and the width between the respective pairs of guide rails which are supported thereby may be varied by loosening the set screws 64 and adjusting the rails to the desired positions, clamping the pins 62 against displacement by means of these set screws when the desired width between a pair of rails has been provided. In practice of course the width between a pair or set of rails will be but little more than the diameter of the bottles to be fed therebetween, and the rails will hence be adjusted for the particular size of bottles to be capped. It may be well to note here also that the shifting members 35 may be readily removed and replaced with corresponding members of different sizes to accommodate different sizes of bottles, the lengths of the wiping fingers 56 carried by said members being of course in correspondence with the size of bottles to be capped. With this end in view, also, the wrist pins 19, above referred to, may be adjustably mounted on the crank disks 18, said disks being radially slotted as at 64', as shown in Fig. 4, for the reception of the shanks of the shouldered pins, so that by shifting the pins 19 inwardly or outwardly toward their axis of rotation, the strokes of the shifting members may be varied.

Figure 8:
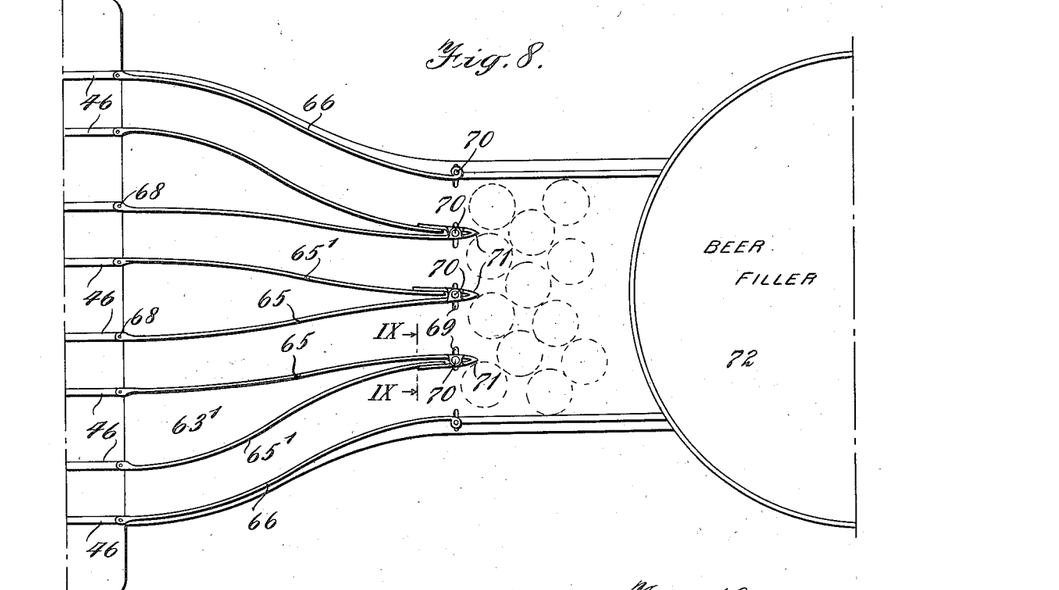
Fig. 8 is a plan of the run-in table with its flexible guides thereon.
Figures 9, 10:
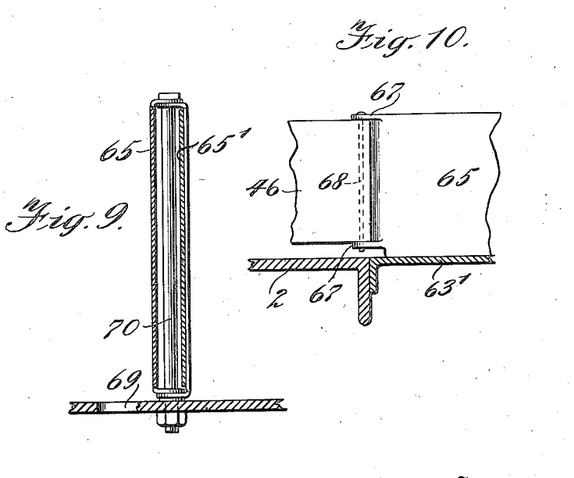
Fig. 9 is a detail section taken on the line IX—IX of Fig. 8.
Fig. 10 is a further detail of said guides.

An auxiliary table 63' is preferably provided, this table having substantially the form indicated in Figs. 2, 3 and 8, and being provided with a series of slightly flexible guide strips 65—65' and 66; the rearmost extremities of these strips being adapted for engagement with the forward extremities of the corresponding rails 46; one form of connection between these parts being shown in Fig. 10, wherein a strip 65 is shown with ears 67 extending therefrom, and the said ears being perforated for the reception of a pin 68 which extends downwardly through the end of the rail. The auxiliary table may be slotted as at 69 for the reception of studs 70, the strips 65 having their forward extremities sharply bent as at 71 to form overlapping portions between which and the respective bodies of the strips 65, are disposed the extremities of the strips 65'. By reason of this construction the studs 70 may be shifted laterally with respect to the table, and thereby one may adjust the width of the channel ways formed by said strips, to accommodate different sizes of bottles, these bottles being deposited from the beer filler 72 upon the forward end of the auxiliary table 63', and the accumulation and continued influx of bottles upon this end of the table forcing said bottles into the channel-ways, above referred to, from whence they are delivered onto the belts 61.

The general operation of the mechanism is as follows: Assuming that a series of bottles have been deposited upon the respective belts and that the capping mechanism is being driven from this pulley 10, the cams 7 will cause, let us say, the right hand pair of plungers to be elevated, and assuming that a bottle has been positioned upon each of these plungers by shifting members 35 in the manner above described, such bottles will be capped and when the said plungers are lowered the bottles will be slid off therefrom by the shifting members to the positions designated 45', in which positions they are not yet subject to the action of belts 60. It may be observed at this point that bottles in positions 44' immediately to the right of the plungers in Fig. 3 are also not subject to the action of belts 61 except indirectly through the pressure which may be exerted by the adjacent bottles which form the remainder of the series, which bottles of course are being urged forward toward the capping heads by the continuously moving belts 61. A bottle disposed as at 46 is, as aforesaid not subject to the adjacent belt 60, and will hence remain stationary until driven onto said belt by the next rearward stroke of the corresponding shifting member.

While the bell levers are adapted to normally elevate the prongs of the shifting members upon the commencement of the return strokes of the links 23, I prefer to provide auxiliary and very positively acting means for aiding this uplifting action, such means in the present exemplification of my invention comprising lip shaped brackets 73 which are secured to the respective plungers 70 and project upwardly from the upper faces thereof, as best shown in Fig. 1, and engage the undersides of the prongs when the plungers are being elevated and thereby positively elevate said prongs so that when the shifting members are longitudinally displaced upon the beginning of their return strokes, the bottles disposed at points 45 and 46 cannot by any possibility be displaced backwardly.

It will be observed that the means employed for oscillating the lever 21, shown in Fig. 6, for example, impart a relatively slow movement to this element when its upper extremity is being rocked toward the plungers, and a relatively rapid movement when the said upper part is being moved away from said plungers. This action is due to the fact that the leverage of the wrist-pin or stud 19 with respect to the shaft 22, is varied, the leverage being considerably longer when the pin is in its lowermost position than when said pin is in its uppermost position or thereabout. Further it will be observed that owing to the fact that this pin is free to slide in the slot 20, a variable motion is imparted to the lever so that when it starts to rock from one extreme position toward the other, its motion is first gradually accelerated and thereafter gradually retarded. This action is of considerable importance, since thereby a bottle begins its travel toward the plunger, or away therefrom, with an easy motion and its speed is gradually accelerated until it has been advanced substantially half the distance which it is to travel. Thereafter its motion is slowed down and it comes to rest, upon the plunger for example, without any abrupt stoppage. In general therefore it will be seen that each given shifting member engages a bottle three successive times; first to move it on to a plunger seat, second to move it from thence to a point 45', and finally to move it from thence on to a belt 60, from whence it may be collected by an attendant. I particularly desire to call attention to the utility of the automatic bottle stopping appliances which comprise the levers 47, pins 49, etc., since it is obvious that if it were not for the provision of some such devices as have been here exemplified, there would be a tendency to advance the bottles inopportunely toward the plungers which would probably result in breakage of bottles and the loss of the contents. The mechanism herein described is particularly efficacious and regular in its action, and in practice has afforded most excellent results. To the best of my knowledge it is based upon principles heretofore not utilized in this or analogous connections and I am fully aware that numerous modifications of various parts of the mechanism may be made within the purview of my invention, and hence desire to be limited only by the scope of the appended claims.

Having described my invention, I claim.

1. In a feeding mechanism, in combination, a reciprocable and rotatable member, means for moving said member, a belt having a substantially straight portion adapted to move articles toward said member, said member having portions thereof adapted to engage said articles, and means for driving said belt, the line of movement over which said member reciprocates being substantially parallel to said straight portion of said belt.

2. In a bottle feeding mechanism, a set of rigid spaced guides, a set of relatively flexible spaced guides, the respective flexible guides and rigid guides being disposed end to end, and bottle shifting mechanism for moving bottles between the respective sets of guides, the guides of each of said sets being spaced apart substantially the diameter of a bottle to be moved.

3. In a feeding mechanism, the combination of a reciprocable member adapted to engage articles to be handled by said feeding mechanism with mechanism for reciprocating said member, a conveying appliance having portions thereof adapted for engagement with said articles, said articles being movable thereby toward said reciprocating member, a stopping device for limiting the advance of said articles toward the reciprocating member, and means for automatically actuating said device at predetermined intervals, said stopping device being disposed beyond said conveying appliance and in the path of movement of the articles being delivered therefrom, said actuating means for said device being operatively connected to said reciprocable member.

4. In a feeding mechanism the combination of a reciprocable and rotatable member, with a guide for said member, and mechanism for reciprocating and rotating said member, said mechanism comprising a plurality of coöperating elements adapted to move said member at greater speed in one direction than in the other, and means whereby the stroke of said member may be varied.

5. The combination of a multiple head bottle capping machine with a bottle feeding mechanism therefor, said mechanism comprising a plurality of reciprocable members adapted to shift bottles into position beneath the capping heads of said machine, and mechanism for reciprocating said members, one of said members being advanced toward a capping head while a second of said members is being retracted from a capping head.

6. In a feeding mechanism, the combination of a reciprocable and rotatable member with guides for said member, and co-acting reciprocating mechanism and rotating mechanism for said member, said rotating mechanism comprising a rack and means for reciprocating said rack, said last mentioned means also constituting a part of said reciprocating mechanism.

7. In a feeding mechanism, the combination of a reciprocable and rotatable member with guides for said member, mechanism for reciprocating and rotating said member, said mechanism comprising a rack, a bell lever for reciprocating said rack, a link connected to said bell lever, said rack, bell lever and link co-acting to rotate said member, and means for limiting the rotary motion of said member.

8. In a feeding mechanism, the combination of a reciprocable and rotatable member with a guide for said member, and mechanism for reciprocating and rotating said member, said mechanism comprising a plurality of parts constituting a train of power transmitting elements for effecting reciprocation of said member, and means adapted to co-act with one of said parts for rotating said member prior to translating the same.

9. In combination with a bottling machine having a plunger and a capping head, a bottle feeding mechanism comprising bottle guides, means for advancing bottles between said guides onto and off of said plunger, said means including a reciprocable shifting member, said member being provided with bottle engaging portions, and a part carried by said plunger adapted to engage a portion of said member, whereby said member is rotated when the plunger is operated.

10. In a feeding mechanism, the combination of a reciprocable and rotatable member with a guide for said member, and mechanism for reciprocating and rotating said member, said mechanism comprising means for rotating said member prior to translating the same in one direction, and auxiliary means for rotating said member prior to translating the same in the reverse direction.

In witness whereof, I subscribe my signature, in the presence of two witnesses.

JOSEPH V. IRENIUS.

Witnesses:
 CHAS. E. WADE,
 WM. A. ROSENBAUM.